June 5, 1962  E. G. SPISAK  3,037,817
WHEEL TRIM
Filed July 10, 1959  2 Sheets-Sheet 2
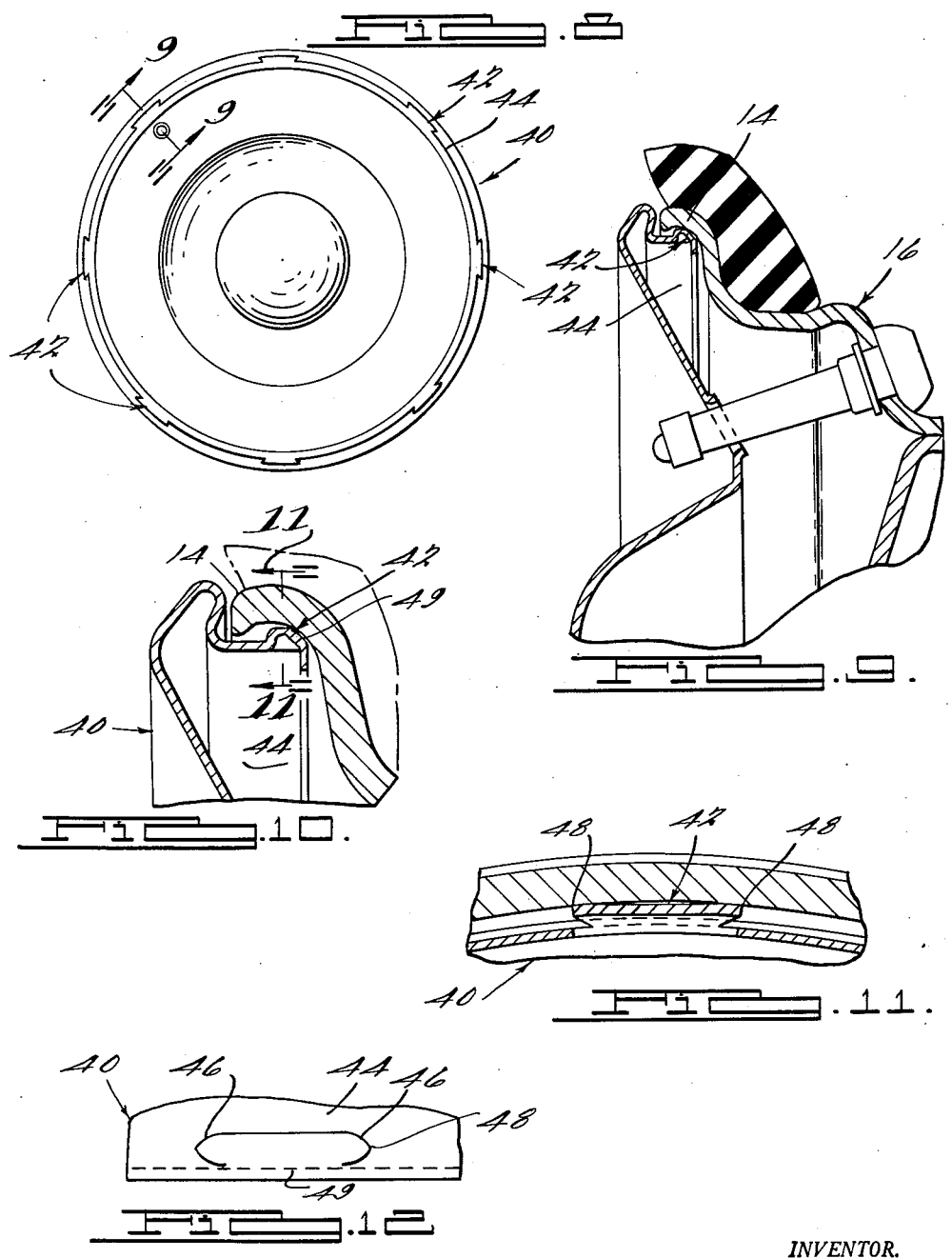
INVENTOR.
Edward G. Spisak.
BY
Harness, Dickey & Pierce
ATTORNEYS.

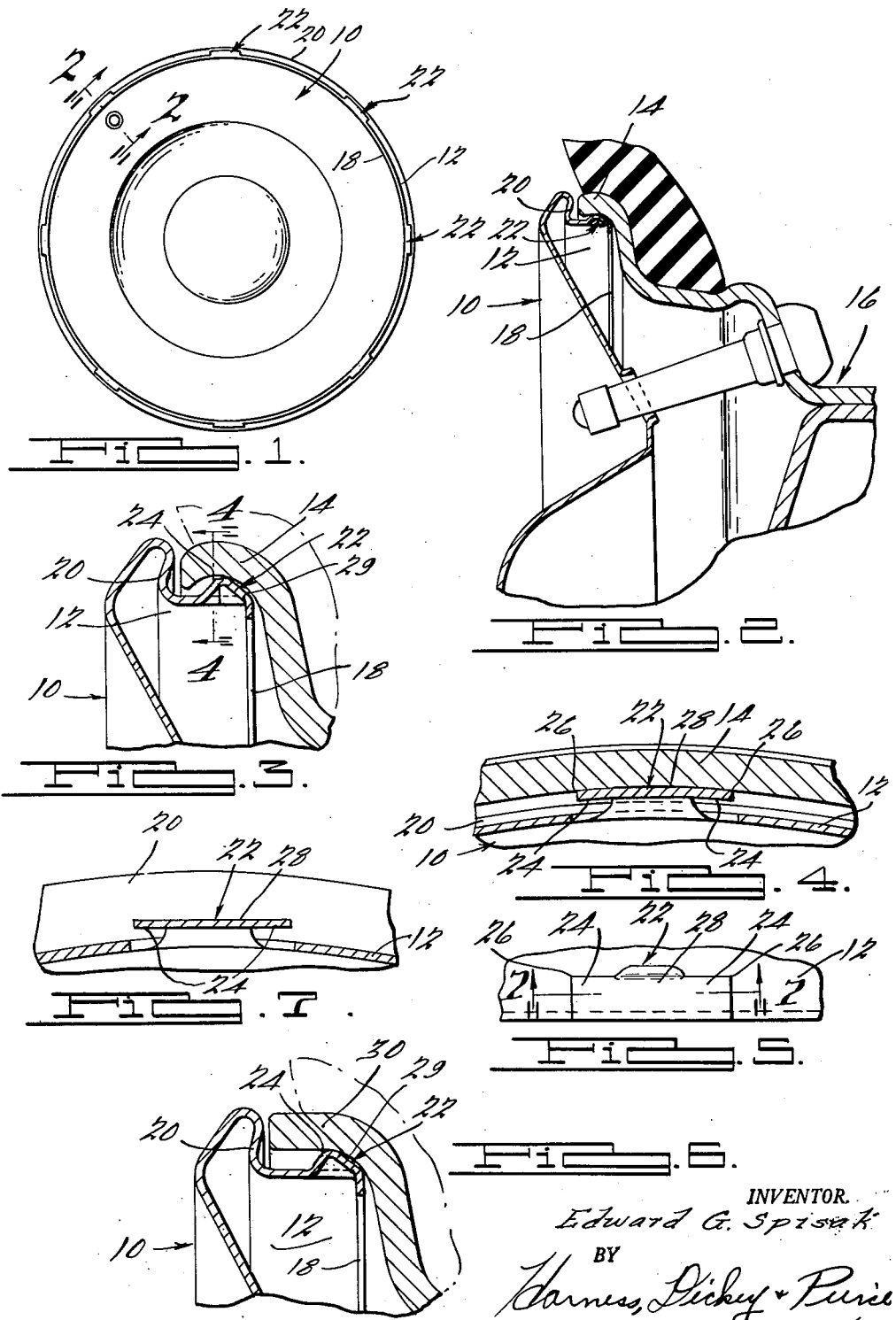

United States Patent Office 3,037,817
Patented June 5, 1962

3,037,817
WHEEL TRIM
Edward G. Spisak, Wayne, Mich., assignor to Gar Wood Industries, Inc., Wayne, Mich., a corporation of Michigan
Filed July 10, 1959, Ser. No. 826,239
4 Claims. (Cl. 301—37)

This invention relates to an improved wheel trim including means integrally formed therewith for removably securing the trim upon the face of an automobile wheel.

The wheel trim according to the present invention is of relatively simple and inexpensive construction and requires no separate clips or attachments on the trim or on the wheel. The trim may be formed without difficult or expensive forming operations, yet the arrangement provides full strength retention of the trim upon the wheel during even rough road service.

One important object of the present invention is to provide an improved wheel trim including integrally formed retaining means for securely but removably retaining the trim upon the face of an automobile wheel.

Other objects of the invention are: to provide an improved wheel trim including portions integrally formed therewith for retainingly engaging the terminal rim flange of an automobile wheel and thereby removably securing the trim on the wheel; to provide an improved wheel trim of this type which can be used interchangeably on automobile wheels having conventional inwardly curled terminal rim flanges and also on those in which the terminal rim flanges are substantially straight; to provide an improved wheel trim of this type including an annular, rearwardly extending flange of resilient construction and having bumps projecting radially from the flange for retaining engagement with the rim flange of an automobile wheel, the bumps being disposed on a circle of at least as great diameter as the rim flange so that when the trim is engaged on the wheel, the trim flange is deflected, and provides a reaction force on the bumps to retain the trim on the wheel; to provide an improved wheel cover of this type including a rearwardly extending flange having specially formed biting teeth projecting radially from it for retainingly engaging an annular radially facing flange of the wheel; to provide an improved wheel trim of this type including circumferentially elongated bumps formed integrally with and projecting radially from an axially extending flange mounted upon the trim, each one of the bumps having lanced end portions which constitute relatively sharp projecting teeth for biting engagement with the wheel flange, the biting teeth being effective both to assist in retention of the trim upon the wheel and to secure the trim against indexing, that is, against rotation relative to the wheel about the wheel axis; and in general, to provide an improved wheel trim for an automobile wheel including integral retaining means, which is relatively simple in design, inexpensive to manufacture, and yet fully dependable and reliable in service.

The foregoing and other objects and advantages of the present invention will become apparent in the following detailed description of representative embodiments thereof, taken in conjunction with the drawings wherein:

FIGURE 1 is a rear elevational view of a wheel trim according to a first embodiment of the invention;

FIG. 2 is a cross-sectional view of the trim illustrated in FIG. 1, taken along the section line 2—2 thereof and showing the trim mounted upon an automobile wheel of the type having a curled terminal rim flange;

FIG. 3 is a fragmentary cross-sectional view generally similar to the view of FIG. 2, but on an enlarged scale in order more clearly to show the construction of the retaining means;

FIG. 4 is a longitudinal sectional view taken along the line 4—4 of FIG. 3;

FIG. 5 is a fragmentary plan view of the cover as shown in FIG. 1;

FIG. 6 is a fragmentary cross-sectional view generally similar to the view of FIG. 3, but showing the cover mounted upon an automobile wheel of the type having a straight terminal rim flange;

FIG. 7 is a longitudinal sectional view taken along the line 7—7 of FIG. 5;

FIG. 8 is a rear elevational view of a wheel trim according to a second embodiment of the invention;

FIG. 9 is a fragmentary cross-sectional view taken along the line 9—9 of FIGURE 8;

FIG. 10 is a fragmentary cross-sectional view generally similar to the view of FIG. 9, but on a larger scale;

FIG. 11 is a fragmentary longitudinal section taken along the line 11—11 of FIG. 10; and, FIG. 12 is a fragmentary plan view, on an enlarged scale, of the trim as shown on FIG. 8.

The business of manufacturing and selling decorative wheel trims is highly competitive, and, accordingly, cost reduction in the production of wheel trim members and assemblies is a relatively important factor. Also, the versatility of a particular wheel trim can have a marked effect on its position in the market. For example, a wheel trim which is adapted to fit any one of a number of different styles of automobile wheels interchangeably is more desirable than a wheel trim which can fit only one type of wheel.

The present invention provides a wheel trim of relatively inexpensive construction and a high degree of versatility, which may be manufactured by stamping, and which includes retaining portions integral with the material of the trim, thus avoiding the added cost of separate retaining elements and of assembling them to the body of the trim.

The wheel trim according to the first embodiment of the present invention is relatively inexpensive to manufacture and can be used interchangeably upon all of the principal types of automobile wheels in present day use. It is designed to be retained by engagement with the terminal rim flange of the wheel, and is dimensioned to overlie the entire wheel to provide for maximum protection and ornamental appearance. The retaining means has been found to provide positive retention not only on the ordinary curled terminal rim flange, but also on the relatively recently introduced special straight flange, and since the trim does not engage other parts of the wheel, it may be used interchangeably on automobile wheels of any of the present commercial types.

Referring now to the drawings, a one-piece self-securing wheel trim 10 according to a first embodiment of the invention is shown therein. The wheel trim 10 may be made of any convenient sheet metal material such as stainless steel or aluminum, and, as shown, is in the form of a circular cover of formed disc-like shape having a diameter approximately equal to the maximum diameter of the wheel 16 to which it is to be fitted so that it will cover and conceal substantially the entire face of the wheel.

The cover 10 carries a rearwardly extending annular flange 12 which is of slightly smaller diameter than the terminal rim flange 14 of the wheel so that it fits within the terminal rim flange 14 in closely spaced relation thereto. The rear end of the flange 12 is reinforced by a radially inwardly extending flange 18 which serves to rigidify the flange 12 and increase its resistance to radial deflection. The front end of the flange 12 is supported and reinforced by a radially extending wall portion 20 of the cover, and the flange 12 itself is made relatively short. This construction provides a high degree of resilience in the flange 12, making it strongly resistant to radial deflection and distortion.

Elongated bumps 22 are struck outwardly from the flange 12 for engaging the terminal rim flange 14 of the wheel and thereby removably securing the cover 10 to the wheel. The bumps 22 are not curved in a circumferential direction to conform to the curvature of rim flange 14, but are formed on a straight line so that they extend substantially parallel to a tangent to the flange 12. The "bump diameter," that is, the span between any two diametrically opposed ones of the bumps 22 is equal to or slightly greater than the internal diameter of the rim flange 14. End portions 24 of the bumps are lanced from the flange 12 to provide axially and radially outwardly facing corners 26 for biting engagement with the rim flange 14. The central portions 28 of the bumps remain integrally connected along both sides to the flange 12 for maximum support.

When the cover 10 is applied to the face of a wheel having a curled terminal rim flange 14 as shown in FIGS. 2 and 3, there is a snap-spring action due to the curvature in the axial direction of the rim flange 14, and the bumps 22 snap into the flange 14 and are held in engagement therewith to retain the trim 10 on the wheel 16. The rearwardly facing rise 29 of each bump slopes smoothly from the rear end of the flange 12, and acts as a cam surface for engagement with the edge of the wheel rim flange 14 to facilitate application of the cover upon the wheel.

The bumps 22 are rigidly supported on the cover flange 12, and the "bump diameter" in the normal, unstressed condition of flange 12 is equal to or greater than the diameter of the rim flange 14. The bumps 22 are, therefore, radially inwardly displaced by the rim flange 14 when the cover is in position on the wheel, and the flange 12 is distorted slightly out of normal to provide, through its resilience, a reaction force which urges the bumps 22 radially outwardly and keeps them in pressure engagement against the rim flange 14. The reinforcing flange 18 is important to provide adequate resilience in the cover flange 12 for positive retention of the cover 10 on the wheel.

When the cover 10 is applied to a wheel having a curled terminal rim flange 14, the biting corners 26 serve primarily to prevent indexing, that is, to prevent rotation of the cover relative to the wheel about the wheel axis.

The cover 10 according to this embodiment of the invention is also well suited for application to a wheel having a special straight rim flange such as the flange 30 shown in FIGURE 6. In this case the biting corners 26 not only prevent indexing, but also serve as the sole retaining means for securing the cover upon the wheel. There is no snap-spring action with this type of terminal flange.

Wheel trims according to the present embodiment of the invention have been extensively tested on both types of wheels, that is, those having the curled terminal rim flange 14 and those having the special straight rim flange 30, and have been found to provide fully adequate retention and anti-indexing characteristics to survive rough road service and to retain their advantageous retention and anti-indexing characteristics even though they are repeatedly removed from and replaced upon the wheels. The covers may be simply removed when desired for servicing by a pry bar or like device inserted between the rim and the outer margin of the cover.

The retaining arrangement of this embodiment provides excellent "easy-on hard-off" characteristics for the trim due to the orientation of the biting corners 26. During application of the cover 10 to the wheel 16, the corners 26 slide relatively easily across the wheel rim flange 14, and offer minimum resistance to movement of the cover into its fully secured position on the wheel. The corners 26 then strongly resist movement of the cover in the reverse direction, that is, away from the wheel, since the corners 26 constitute outwardly directed teeth, and tend to bite into the wheel in response to any outward force exerted on the cover 10.

The wheel cover 40 shown in FIGS. 8 through 12 represents a second embodiment of the invention, and is especially adapted for use with wheels having a curled terminal wheel flange 14. The cover 40 differs from the hereinabove described cover 10 in the formation of its retaining bumps 42. In all other respects it may be exactly similar to the cover 10 shown in FIGS. 1 through 7.

The bumps 42 in this second embodiment are stuck radially outwardly from the annular cover flange 44, similarly to the bumps 22 of the first embodiment and are integrally connected to the flange 44 along their front and rear sides. End portions of the bumps 42 are lanced from the flange 44 to form biting extensions, or tangs 46, which extend in a tangential direction relative to the flange 44. The bumps 42 are straight on their outer surfaces, and the biting extensions 46 lie along the same lines as the bumps 42. The rearwardly facing rise 49 of each bump slopes smoothly from the rear end of the flange 44 to provide a camming action against the wheel rim flange 14 during application of the cover on the wheel.

The principal difference between the bumps 42 of the present embodiment and the bumps 22 of the first embodiment lies in the direction of the extensions, or tangs 46 relative to the direction of the corners 26. The corners 26 are directed diagonally outwardly from the wheel on which the cover 10 is mounted, while the extensions 46 are directed in a tangential direction in line with the length of the bumps. The extensions 46 terminate in relatively sharp points 48 which bite into the rim flange 14 for securing the cover 40 against indexing. The points 48 are oriented to minimize their effect on the application of the cover to, and removal from the wheel since with the curled rim flange 14, the snap spring action provides fully adequate retention.

As in the first embodiment, the span of the bumps 42 is equal to or slightly greater than the internal diameter of the rim flange 14 so that when the cover 40 is in position on the wheel 16, the flange 44 is slightly distorted and reacts upon the bumps 42 to urge them into pressure engagement with the rim flange 14.

The bumps 22 and 42 may be readily formed on a cam die in a single pressing operation, which will simultaneously form the bumps and lance the end portions 24 and 46 from the flange. For maximum retention of the cover 10 or 40 on the wheel, it is preferred to use a relatively large number of bumps 22 or 42, such as the eight illustrated in FIGS. 1 and 7, to distribute the load and to maximize the reactive force exerted by the cover flange 12 or 44.

The same die may be used alternatively for forming the retaining bumps of the wheel trim members according to either of the two illustrated embodiments of the invention. It is only necessary to change the tooling of the die when switching from one type of lanced teeth to the other type.

Wheel trim members, according to the present invention, are relatively inexpensive to manufacture, requiring a minimum quantity of material and no extra parts, such as separate retaining clips which must be attached to the trim, yet they are fully effective and trouble free in service. They do not become dislodged even during extreme rough road service, and after they have been repeatedly applied to, and removed from, the automobile wheels. They are characterized also by a highly desirable "easy on-hard off" feel of application on the wheel.

It has also been found that wheel trims according to the invention are extremely quiet in service, and do not create squeaks, rattles or other wheel noises, such as are often encountered with previous biting type wheel trim retaining arrangements.

What is claimed is:

1. In a wheel structure having an axially extending flange, a wheel trim for disposition on the frontal face of the wheel comprising a generally circular face member, a rearwardly extending annular flange secured to said face member adjacent to the periphery thereof and having a diameter smaller than the diameter of the axial flange on the wheel so that said annular flange on the trim can be fitted readily therein and lie in closely spaced relation thereto, and radially outwardly projecting circumferentially elongated and tangentially orientated bumps formed in the annular flange of said wheel trim, each one of said bumps having end portions lanced from the annular flange of said wheel trim and arranged generally tangentially to the annular flange for biting engagement with the axial flange on the wheel, the central portion of each one of said bumps being integrally joined to said annular flange along both sides of the bump.

2. In a wheel structure having an axially extending rim flange, a wheel trim for disposition on the frontal face of the wheel comprising a generally circular member having a diameter approximately equal to the diameter of the wheel, a rearwardly extending annular flange secured to said circular member adjacent to the periphery thereof and having a diameter smaller than the diameter of the terminal rim flange of the wheel rim so that said annular flange on the wheel trim can be fitted readily within the rim flange on the wheel and lie in closely spaced relation thereto, and radially outwardly projecting circumferentially elongated bumps formed in said annular flange on said wheel trim, each one of said bumps having end portions lanced from said annular flange and arranged for biting engagement with the rim flange on the wheel, the central portion of each one of said bumps being integrally joined to said annular flange on said wheel trim along both sides of the bump, the central points of all of said bumps lying on a circle having a diameter at least as large as the internal diameter of the rim flange of the wheel.

3. In a wheel structure having an axially extending rim flange, a wheel trim for disposition on the frontal face of the wheel comprising a generally circular member having a diameter approximately equal to the diameter of the wheel, an annular flange integral with said member and extending rearwardly therefrom, said annular flange being dimensioned to fit in closely spaced relationship within the terminal rim flange of the wheel, and radially projecting circumferentially elongated bumps formed in said annular flange at angularly spaced locations thereon, each one of said bumps having end portions lanced from said annular flange to form biting tangs projecting in a tangential direction relative to said annular flange for biting engagement with the rim flange on the wheel thereby to hold said trim against rotation with respect to the wheel about the wheel axis.

4. In a wheel structure haivng an axially extending rim flange, a wheel trim for disposition on the frontal face of the wheel comprising a generally circular member having a diameter approximately equal to the diameter of the wheel, an annular flange integral with said member and extending rearwardly therefrom, said annular flange being dimensioned to fit in closely spaced relationship within the terminal rim flange of the wheel, and radially projecting circumferentially elongated bumps formed in said annular flange at angularly spaced locations thereon, each one of said bumps having a crown portion and opposite end portions defining circumferentially facing teeth for biting engagement with the rim flange, on the wheel, said teeth being effective to hold said trim upon the wheel and also to prevent rotation of the trim relative to the wheel about the wheel axis, the crowns of said bumps being substantially straight and parallel to tangents drawn to said annular flange at the respective locations of said bumps whereby central portions of at least certain ones of said bumps are normally out of contact with the terminal rim flange on the wheel, the crowns of said bumps being formed to lie along tangents to a circle having a diameter at least as large as the internal diameter of the rim flange on the wheel whereby when said trim is positioned on a wheel the rim flange forces said bumps radially inwardly thereby stressing said annular flange.

References Cited in the file of this patent

UNITED STATES PATENTS

| | | |
|---|---|---|
| 2,792,261 | Tell et al. | May 14, 1957 |
| 2,865,683 | Lyon | Dec. 23, 1958 |
| 2,902,387 | Lyon | Sept. 1, 1959 |
| 2,921,815 | Lyon | Jan. 19, 1960 |
| 2,932,540 | Lyon | Apr. 12, 1960 |

FOREIGN PATENTS

| | | |
|---|---|---|
| 798,159 | Great Britain | July 16, 1958 |